US011912386B2

(12) United States Patent
Anderson et al.

(10) Patent No.: US 11,912,386 B2
(45) Date of Patent: Feb. 27, 2024

(54) REMOTE OPERATED VEHICLES AND/OR AUTONOMOUS UNDERWATER VEHICLES

(71) Applicant: Boxfish Research Limited, Remuera Auckland (NZ)

(72) Inventors: Craig Thomas Anderson, Auckland (NZ); Benjamin Martin King, Waiheke Island (NZ)

(73) Assignee: BOXFISH RESEARCH LIMITED, Auckland (NZ)

( * ) Notice: Subject to any disclaimer, the term of this patent is extended or adjusted under 35 U.S.C. 154(b) by 504 days.

(21) Appl. No.: 17/045,454

(22) PCT Filed: Apr. 5, 2019

(86) PCT No.: PCT/NZ2019/050035
§ 371 (c)(1),
(2) Date: Oct. 5, 2020

(87) PCT Pub. No.: WO2019/194684
PCT Pub. Date: Oct. 10, 2019

(65) Prior Publication Data
US 2021/0163107 A1    Jun. 3, 2021

(30) Foreign Application Priority Data
Apr. 6, 2018   (NZ) .................................. 741396

(51) Int. Cl.
*B63G 8/00*    (2006.01)
*B63B 79/40*   (2020.01)
(Continued)

(52) U.S. Cl.
CPC .............. *B63G 8/001* (2013.01); *B63B 79/10* (2020.01); *B63B 79/40* (2020.01); *B63G 8/08* (2013.01); *B63H 11/00* (2013.01); *B63H 21/21* (2013.01); *G05D 1/0011* (2013.01); *G05D 1/0088* (2013.01); *B63G 2008/004* (2013.01)

(58) Field of Classification Search
CPC .... B63G 8/001; B63G 8/08; B63G 2008/004; B63G 2008/005; B63G 8/16; B63B 79/10; B63B 79/40; B63B 2211/02; B63H 11/00; B63H 21/21; B63H 21/17; B63H 2011/008; G05D 1/0011; G05D 1/0088; G05D 1/06; G05D 1/0206; G05D 1/0692; G05D 1/048
See application file for complete search history.

(56) References Cited

U.S. PATENT DOCUMENTS 3,752,103 A    8/1973  Middleton
5,097,780 A    3/1992  Winchester
(Continued)

FOREIGN PATENT DOCUMENTS

CN    105404303    3/2016
CN    107226185    10/2017

*Primary Examiner* — Anthony D Wiest
(74) *Attorney, Agent, or Firm* — Finnegan, Henderson, Farabow, Garrett & Dunner, LLP

(57) ABSTRACT

An underwater ROV or AUV with 8 vectored thrusters that provides a high degree of dynamic stabilisation, 6-degrees of freedom, and a system to control an underwater ROV or AUV with single or multiple thruster failures. In addition, the ROV/AUV has a system to minimise silt disturbance when operating close to fine silt or sensitive environments.

6 Claims, 13 Drawing Sheets

(51) Int. Cl.
B63B 79/10 (2020.01)
B63G 8/08 (2006.01)
B63H 11/00 (2006.01)
B63H 21/21 (2006.01)
G05D 1/00 (2006.01)

(56) References Cited

U.S. PATENT DOCUMENTS

| | | | | |
|---|---|---|---|---|
| 6,476,853 | B1 * | 11/2002 | Zernov | G03B 17/08 |
| | | | | 348/81 |
| 9,115,662 | B1 * | 8/2015 | Claggett | G06F 11/00 |
| 10,106,233 | B2 * | 10/2018 | Lichter | B63G 8/08 |
| 10,392,085 | B2 * | 8/2019 | Wang | A01K 99/00 |

* cited by examiner

201

REMOTE OPERATED VEHICLES AND/OR AUTONOMOUS UNDERWATER VEHICLES

FIELD

This invention relates to Remote Operated Vehicles and/or to Autonomous Underwater Vehicles.

BACKGROUND

The present invention relates to remote operated vehicles or ROVs for use underwater, and/or to autonomous underwater vehicles or AUVs.

ROVs typically comprise a "submarine" unit or vehicle (vehicle), a top-side remote control unit (topside unit), and an umbilical cable connecting the two units together for transmitting control signals from the topside unit to the vehicle, and for transmitting information, video and signals from the vehicle to the topside unit. The umbilical cable may also transmit power for the vehicle or the vehicle may contain its own power source (batteries).

AUVs differ from ROVs in that they don't have an umbilical, always carry their own power source, and are instead programmed to accomplish a certain task on their own using sensors and/or position information. AUVs may communicate without a tether to the surface, but the amount of information that can be sent in either direction is limited.

ROV/AUV thrusters can disturb silt when operating near the bottom or within submerged structures or wrecks. The silt can result in moderate to severe visual impairment and it can adversely affect measurements and sampling. The silt disturbance is the result of thrust towards the bottom or silted surface or it is the result of turbulence or hydrodynamic effects of the vehicles motion. Avoiding silt disturbance is a common requirement of ROVs/AUVs working near silt.

It is an object of the invention to provide a Remote Operated Vehicle or to at least provide the public or industry with a useful choice.

SUMMARY

According to one example embodiment there is provided an underwater vehicle comprising:
  a vehicle body, having a centre, a front, back, sides, top and bottom;
  a plurality of thrusters aligned such that the thrusters are offset from the vertical and horizontal relative to the centre of the vehicle, each of the plurality of thrusters being located at a corner of the vehicle, the offset of the thrusters being such that thrust from the thrusters is outside of an area defined by a front frustoconical cone projecting from the front of the vehicle body and a rear frustoconical cone projecting from the rear of the vehicle body, the front frustoconical cone being centred on the centre of the front of the vehicle, the front frustoconical cone having a small end and a large end, the small end of the front frustoconical cone located at the front of the vehicle, the rear frustoconical cone being centred on the centre of the rear of the vehicle, the rear frustoconical cone having a small end and a large end, the small end of the rear frustoconical cone located at the rear of the vehicle; and
  a controller operable to activate the thruster to move the vehicle in a desired direction.

Preferably the vehicle further has a dome located at the front of the vehicle, the small end of the front frustoconical cone being substantially the size of as the dome.

Preferably a camera lens is located in the dome and substantially directed horizontally to the front of the vehicle, the thrusters being located such that the thrusters are located on the vehicle such that the thrusters are within a vertical plane at the front of the lens.

Alternatively the dome is replaced by a flat window.

Preferably the underwater vehicle has a centre of mass and a centre of buoyancy and the underwater vehicle is balanced such that the centre of mass and the centre of buoyancy are the same.

Preferably the thrusters are offset between 40 and 50 degrees from vertical and horizontal.

More preferably the thrusters are offset between 44 and 46 degrees from vertical and horizontal.

Even more preferably the thrusters are offset 45 degrees from vertical and horizontal.

Preferably the plurality of thrusters is 8 thrusters.

Preferably the controller is operable to move the vehicle with less than 8 thrusters.

Preferably controller is operable to detect inoperable thrusters.

Preferably the controller is operable to detect objects that may be disturbed by thruster operation and operate the thrusters to minimise disturbance.

Preferably the object that may be disturbed is silt.

Preferably the vehicle is remotely controlled.

Alternatively the vehicle is a Remote Operated Vehicle.

Alternatively the vehicle is autonomous.

Alternatively the vehicle is an Autonomous Underwater Vehicle.

According to a further example embodiment there is provided an underwater vehicle comprising:
  a vehicle body, having a centre;
  a plurality of thrusters aligned such that the thrusters are offset from the vertical and horizontal relative to the centre of the vehicle, each of the plurality of thrusters being located at a corner of the vehicle, the offset of the thrusters being such that thrust from the thrusters is outside of an area defined by a front frustoconical cone projecting from the front of the vehicle body and a rear frustoconical cone projecting from the rear of the vehicle body, the front frustoconical cone being centred on the centre of the front of the vehicle, the front frustoconical cone having a small end and a large end, the small end of the front frustoconical cone located at the front of the vehicle, the rear frustoconical cone being centred on the centre of the rear of the vehicle, the rear frustoconical cone having a small end and a large end, the small end of the rear frustoconical cone located at the rear of the vehicle; and
  a controller operable to activate the plurality of thrusters to move the vehicle in a desired direction, wherein the controller is operable to move the vehicle with less than all the plurality of thrusters.

Preferably the controller is operable to detect inoperable thrusters.

Preferably the controller is operable to detect objects that may be disturbed by thruster operation and operate the thrusters to minimise disturbance.

Preferably the object that may be disturbed is silt.

Preferably the plurality of thrusters is 8 thrusters.

Preferably wherein the vehicle is remotely controlled.

Alternatively the vehicle is a Remote Operated Vehicle.

Alternatively the vehicle is autonomous.

Alternatively the vehicle is an Autonomous Underwater Vehicle.

According to a yet further example embodiment there is provided an underwater vehicle comprising:
- a vehicle body, having a centre;
- a plurality of thrusters aligned such that the thrusters are offset from the vertical and horizontal relative to the centre of the vehicle, each of the plurality of thrusters being located at a corner of the vehicle, the offset of the thrusters being such that thrust from the thrusters is outside of an area defined by a front frustoconical cone projecting from the front of the vehicle body and a rear frustoconical cone projecting from the rear of the vehicle body, the front frustoconical cone being centred on the centre of the front of the vehicle, the front frustoconical cone having a small end and a large end, the small end of the front frustoconical cone located at the front of the vehicle, the rear frustoconical cone being centred on the centre of the rear of the vehicle, the rear frustoconical cone having a small end and a large end, the small end of the rear frustoconical cone located at the rear of the vehicle; and
- a controller operable to activate the plurality of thrusters to move the vehicle in a desired direction, wherein the controller is operable to detect objects that may be disturbed by thruster operation and operate the thrusters to minimise disturbance.

Preferably the object that may be disturbed is silt.
Preferably the plurality of thrusters is 8 thrusters.
Preferably the vehicle is remotely controlled.
Alternatively the vehicle is a Remote Operated Vehicle.
Alternatively the vehicle is autonomous.
Alternatively the vehicle is an Autonomous Underwater Vehicle.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

Control

Figure 1:
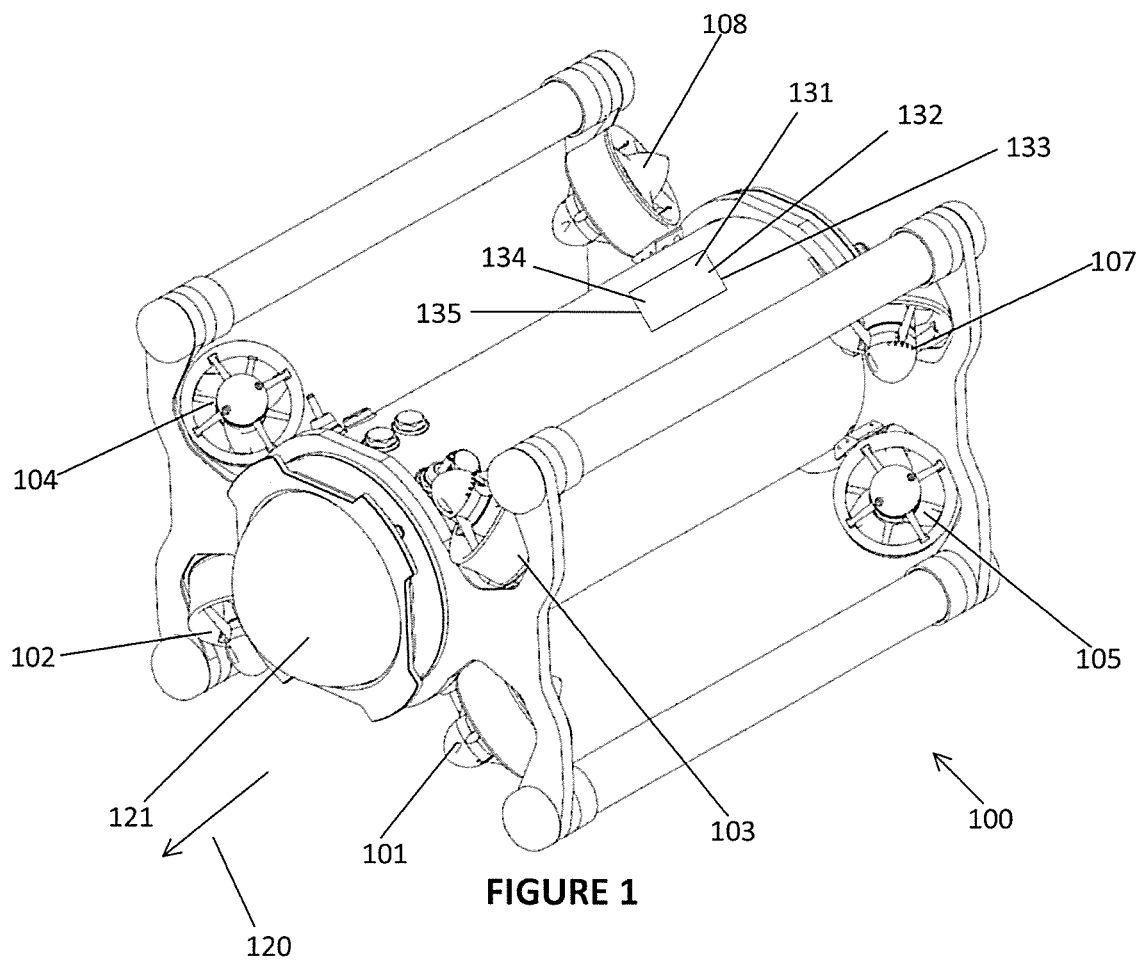
FIG. 1 is an isometric view of the vehicle of an example embodiment.
Figure 2:
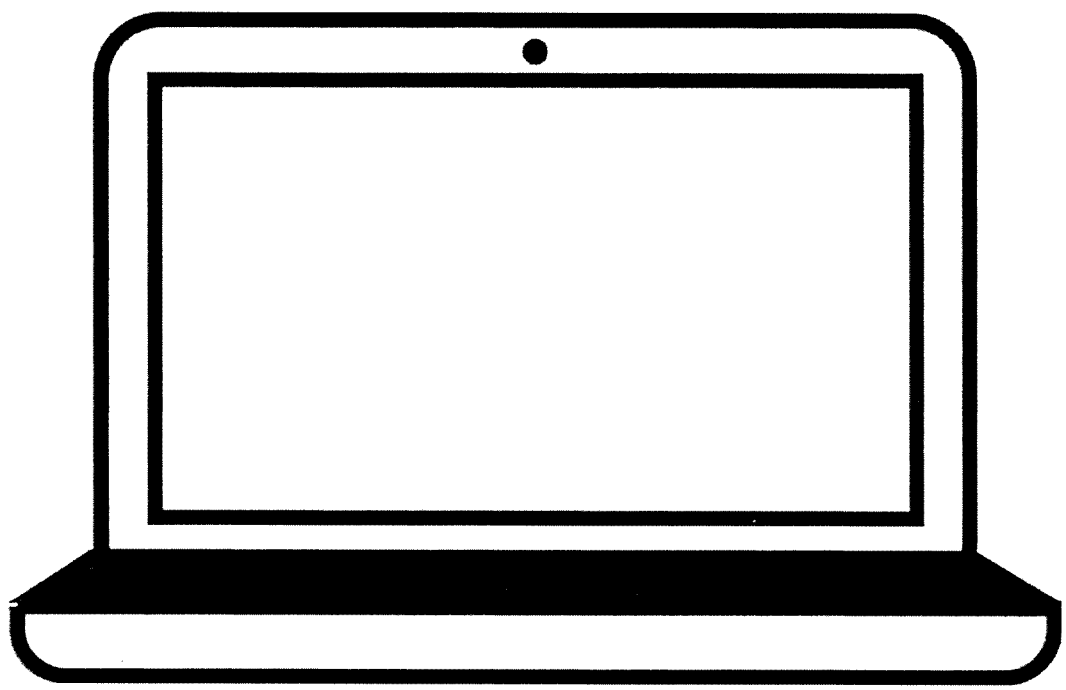
FIG. 2 is a view of an electronic topside unit of an example embodiment.
Figure 3:
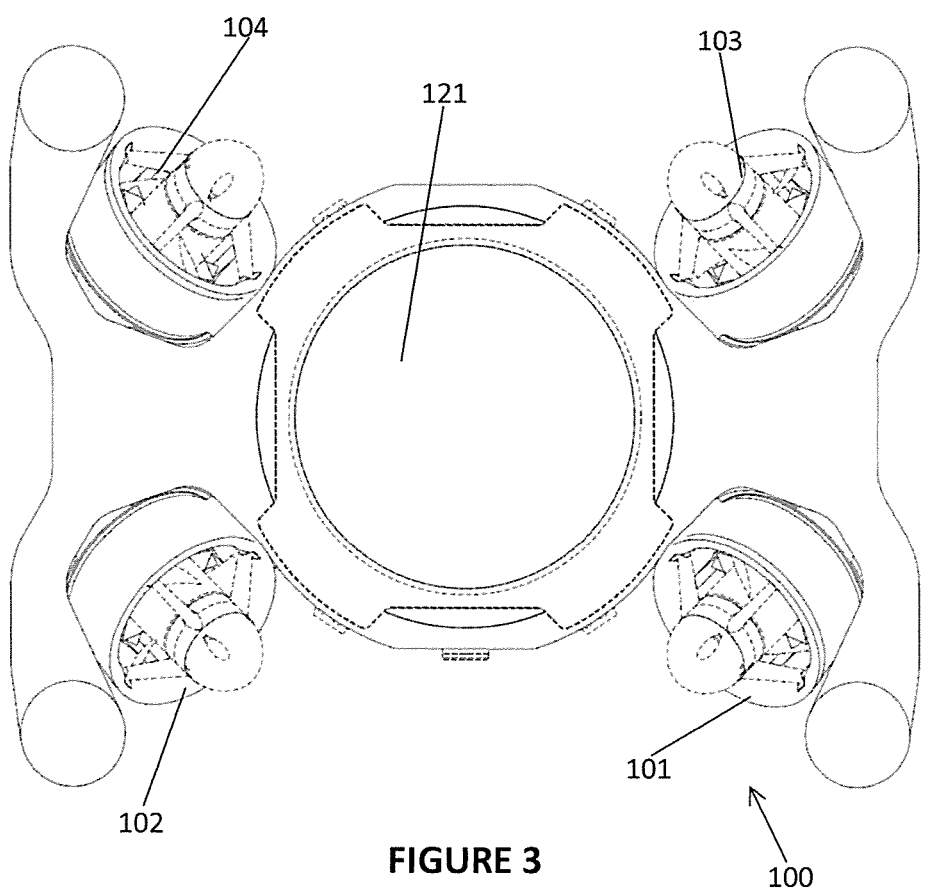
FIG. 3 is a front view of the vehicle of FIG. 1.
Figure 4:
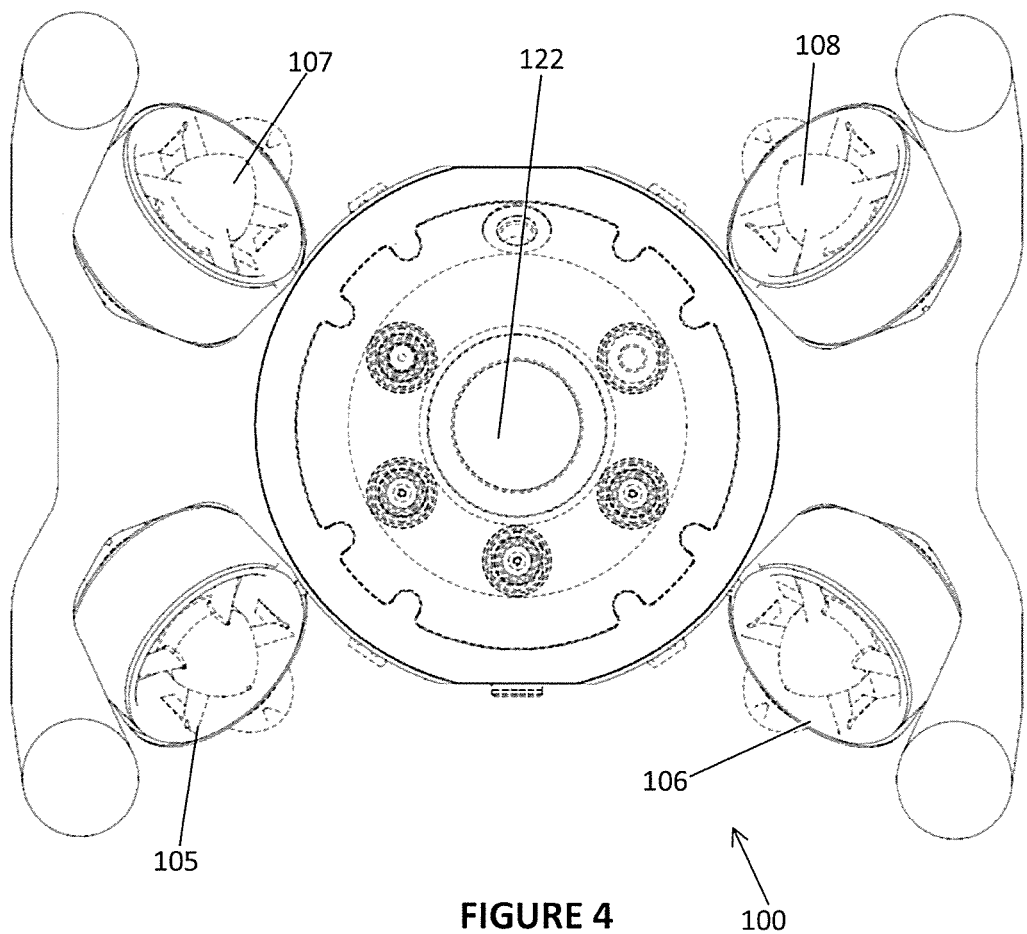
FIG. 4 is an end view of the vehicle of FIG. 1.
Figure 5:
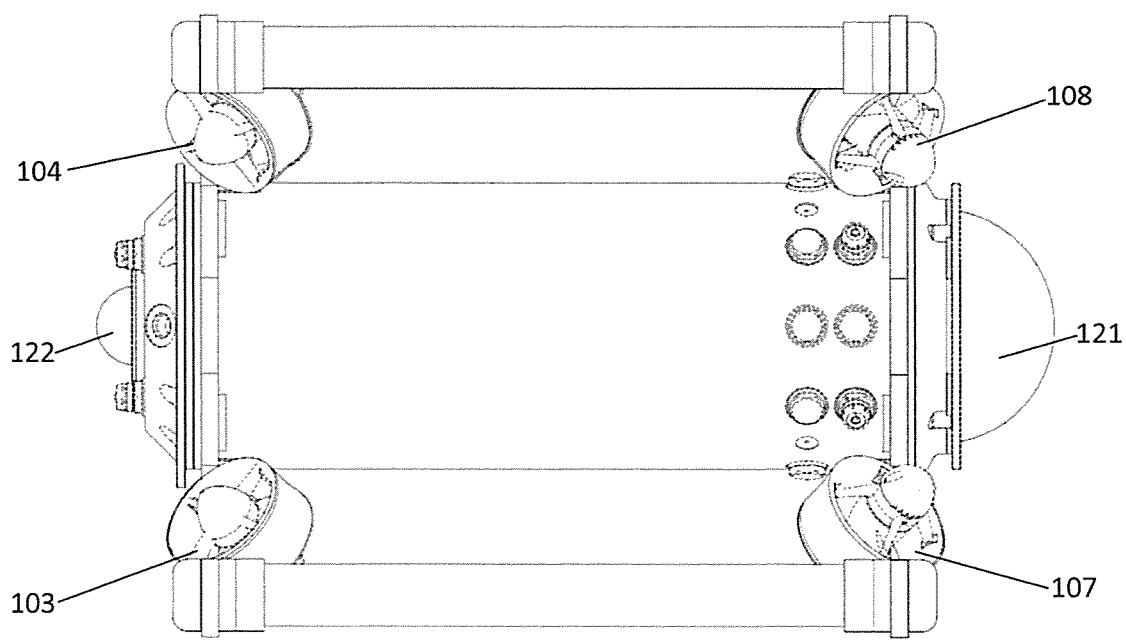
FIG. 5 is a top view of the vehicle of FIG. 1.
Figure 6:
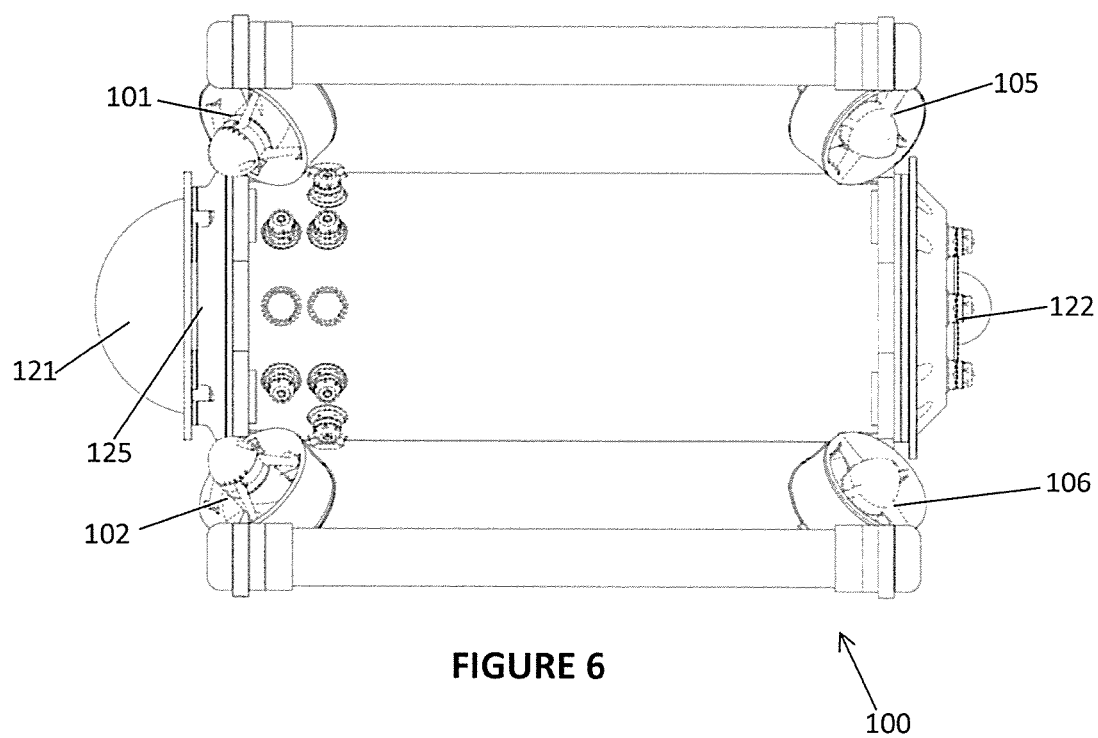
FIG. 6 is a bottom view of the vehicle of FIG. 1.

The vehicle 100 in one embodiment illustrated in FIGS. 1 and 3 to 6 contains 8 thrusters 101-108 in the corners of an open rectangular design. The thrusters 101-108 are offset from the vertical and from the horizontal in the manner shown in FIG. 1 and FIGS. 3 to 6. Preferably the offset is between 40 and 50 degrees from vertical and horizontal. More preferably the offset is between 44 and 46 degrees from vertical and horizontal. Even more preferably the offset is 45 degrees from vertical and horizontal.

It should be noted that pitch control with this thruster configuration is dependent on the vehicle 100 having a length which differs reasonably from height.

The thrusters in this configuration allow independent control of the three rotational axes (roll, pitch, and yaw), and the three translational axes being x/longitudinal/surge; y/lateral/sway; and z/vertical/heave.

In use the vehicle 100 has a forward direction and a dome 121 is located at the front of the vehicle 100. The dome is typically transparent and can be replaced by a flat plate window. The vehicle 100 having a front, a back, sides, a top and a bottom. The dome 121 typically houses at least one camera having a lens 125. The dome 121 may house more than one lens. The rear of the vehicle 100 may also have a dome 122. Typically the dome 122 at the rear of the vehicle is smaller and may also house a camera.

Figure 7:
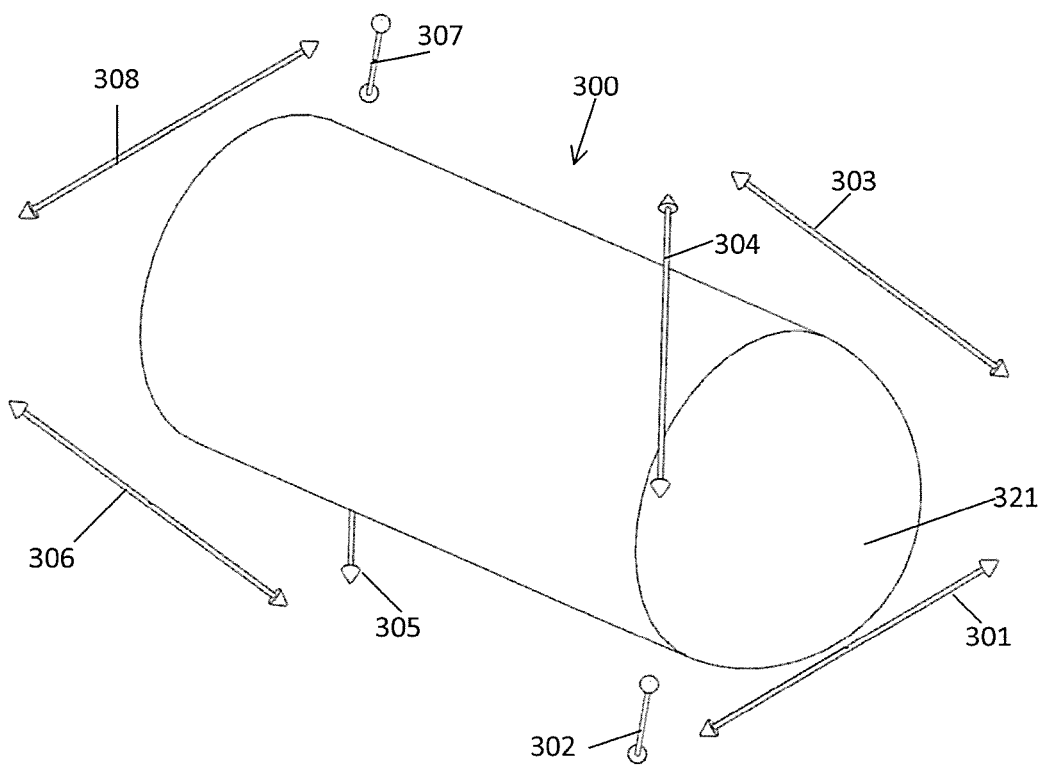
FIG. 7 is a schematic diagram of one embodiment of a vehicle showing the thruster vectors.
Figure 8:
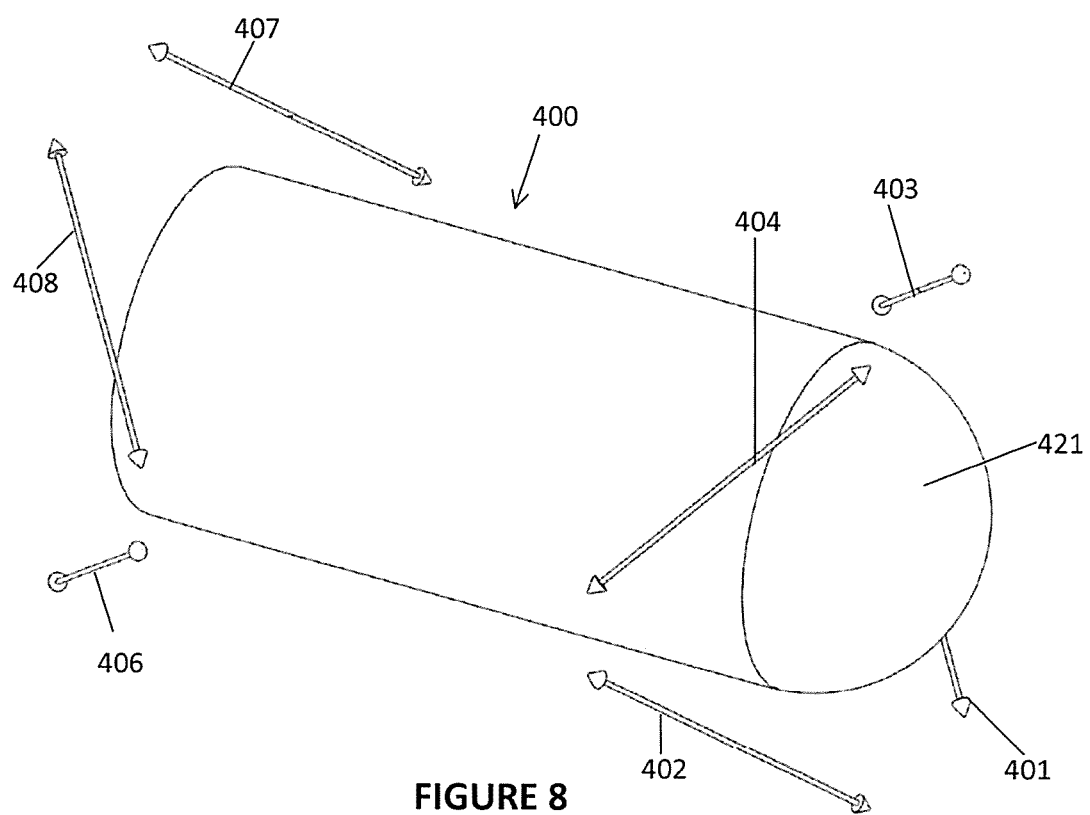
FIG. 8 is a schematic diagram of a further embodiment of a vehicle showing the thruster vectors.
Figure 9:
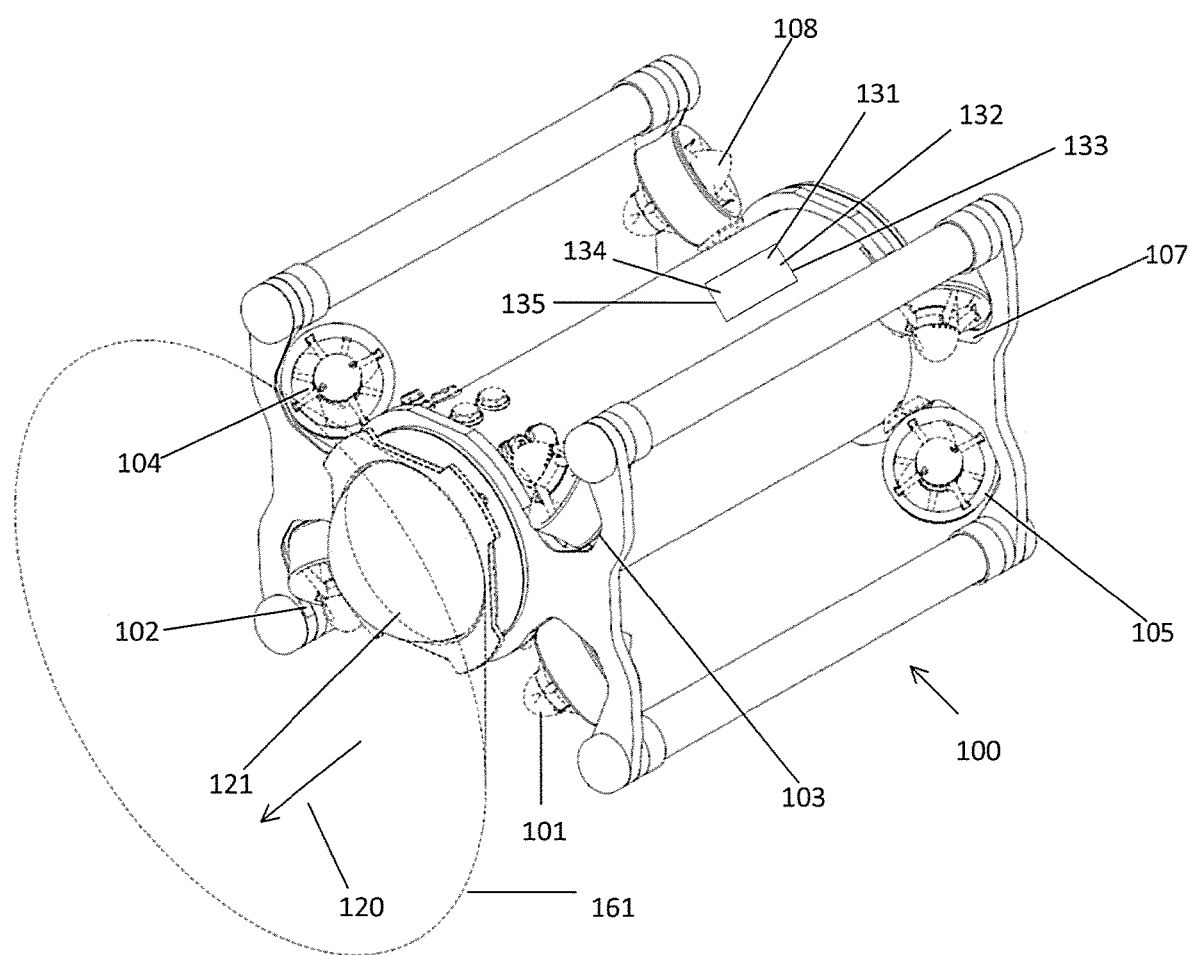
FIG. 9 is an isometric view of the vehicle of FIG. 1 showing a frustoconical cone into which the thrusters do not direct any thrust.
Figure 10:
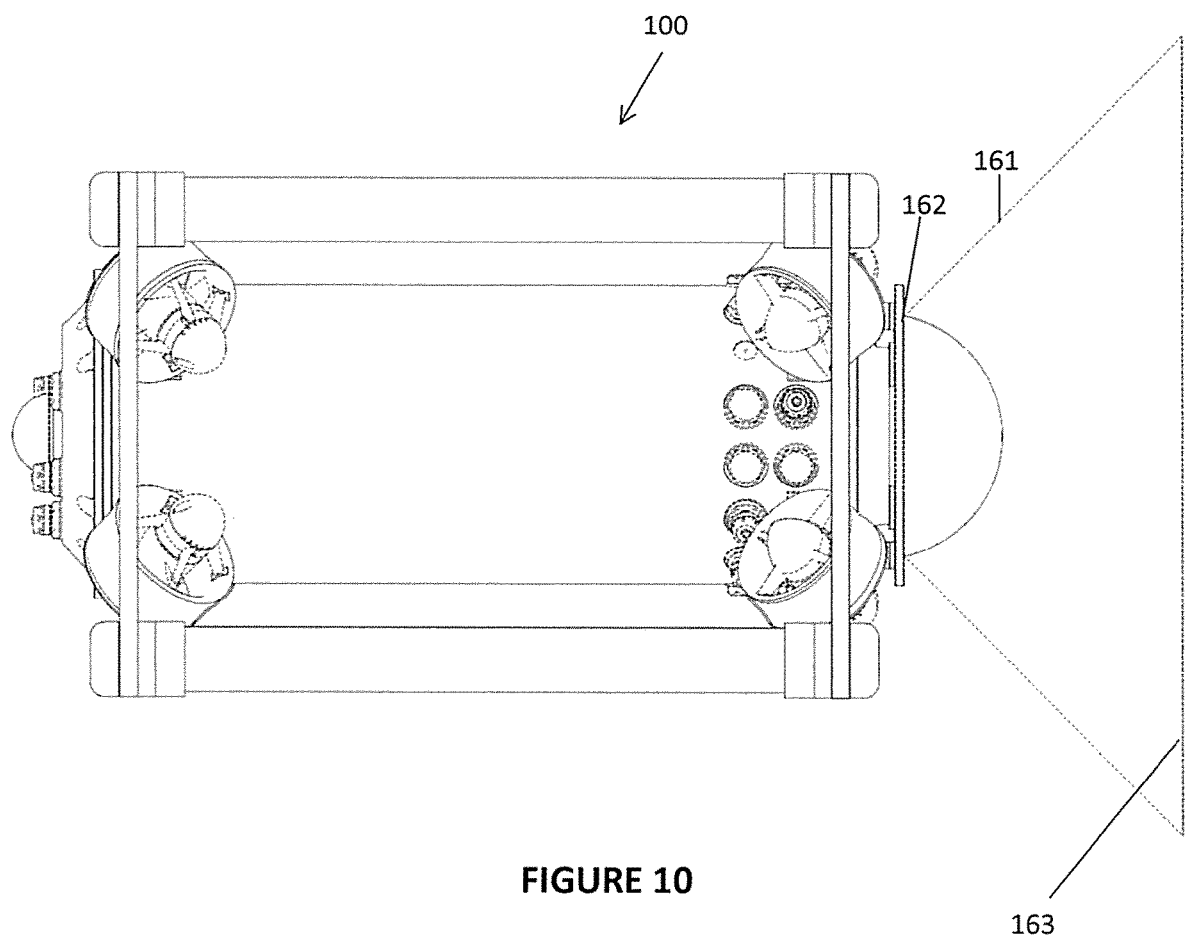
FIG. 10 is a top view of the vehicle of FIG. 1 showing a frustoconical cone into which the thrusters do not direct any thrust.
Figure 11:
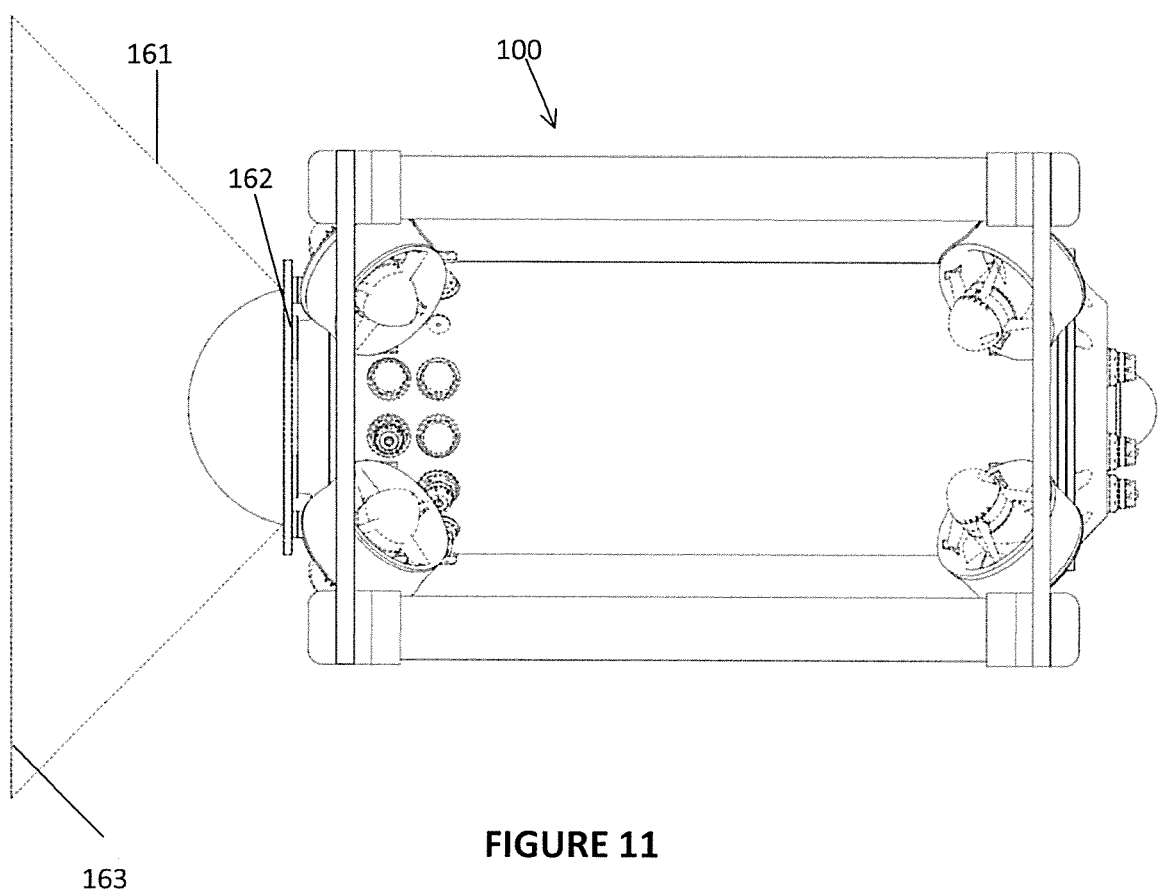
FIG. 11 a bottom view of the vehicle of FIG. 1 showing a frustoconical cone into which the thrusters do not direct any thrust.
Figure 12:
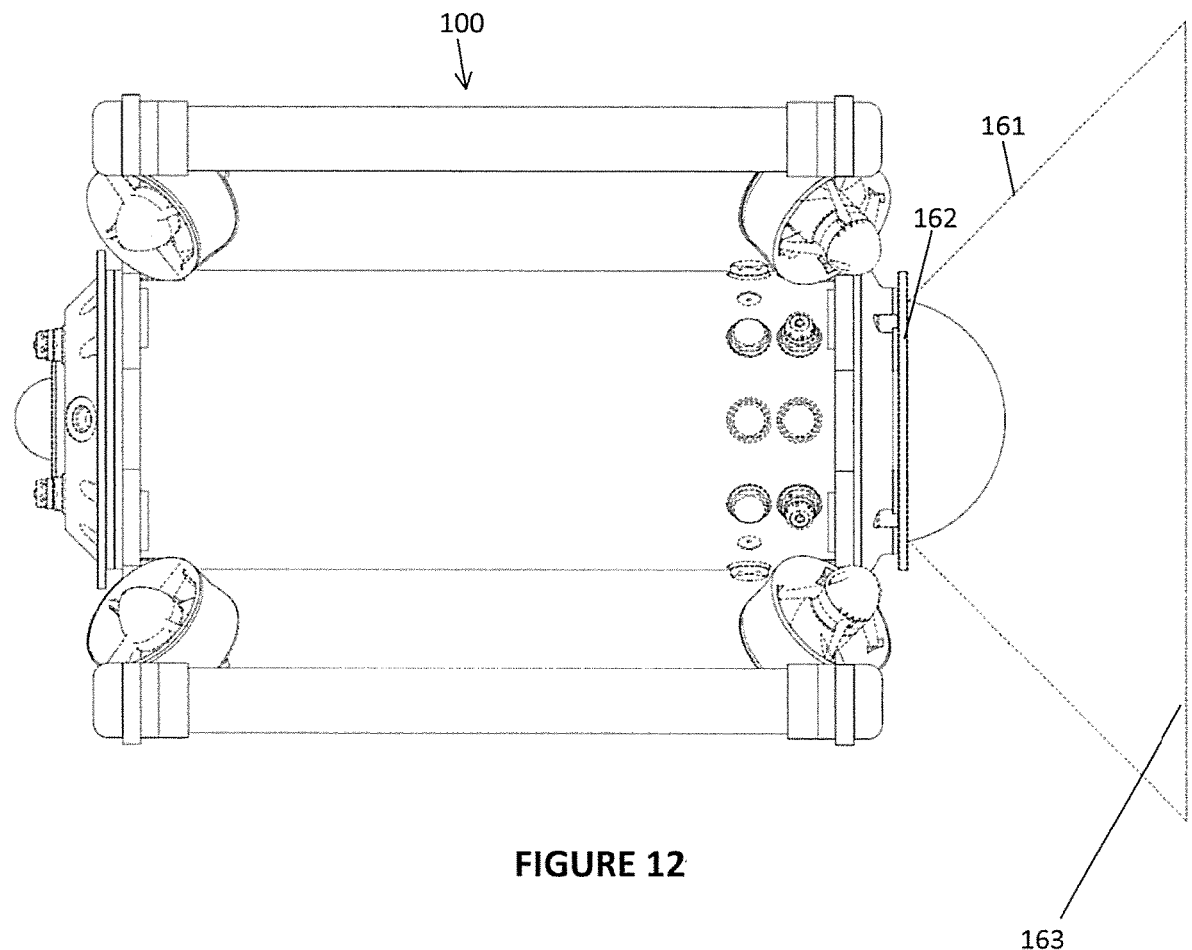
FIG. 12 is a first side view of the vehicle of FIG. 1 showing a frustoconical cone into which the thrusters do not direct any thrust.
Figure 13:
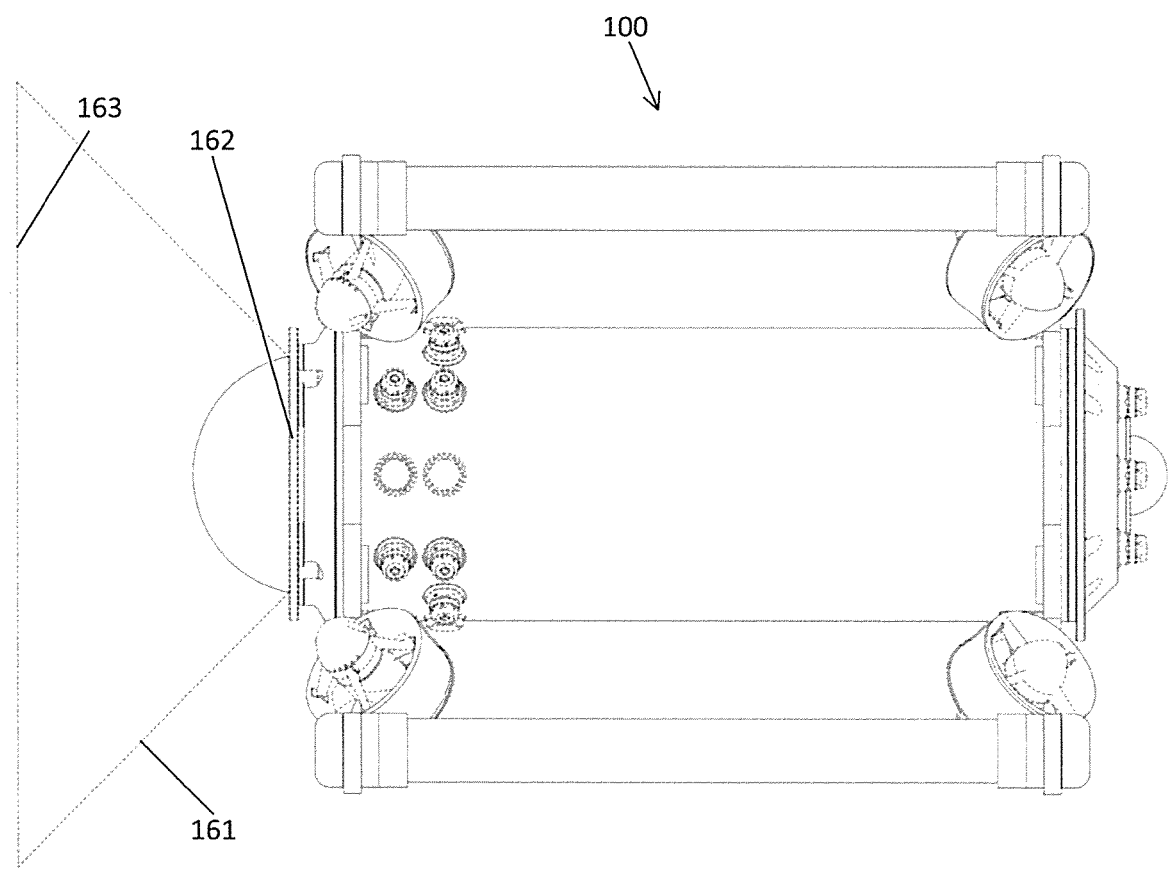
FIG. 13 is a second side view of the vehicle of FIG. 1 showing a frustoconical cone into which the thrusters do not direct any thrust.

Referring to FIGS. 7 and 8 two alignment options for the thrusters 101-108 are illustrated. Referring to FIG. 7 the vehicle 300 has 8 thrusters and a front dome 321. The thrust angles are illustrated by arrows 301-308. The thrust angles all point away from the front dome and the rear. In a similar manner referring to FIG. 8 the vehicle 400 has 8 thrusters and a front dome 421. The thrust angles are illustrated by arrows 401-404 and 406-408. The thrust angles all point away from the front dome and the rear.

The thrusters 101-108 thus do not direct water in front of the dome. This can be seen in FIGS. 9 to 13 and which show a frustoconical cone 161 in dashed lines showing the area into which no thrust is directed. The frustoconical cone 161 being centred on the centre of the front of the vehicle 100 and having a smaller end 162 and a larger end 163. The smaller end 162 of the frustoconical cone 161 being substantially the same diameter as the diameter of the dome. 121. This allows the camera lens 125 in the dome 121 to be unobstructed. In a similar manner a frustoconical cone area at the rear 122 of the vehicle 100 also has no thrust directed into it by the thrusters 101-108. The frustoconical cone being centred on the centre of the front of the vehicle. The rear frustoconical cone also has the smaller end of the frustoconical cone being substantially the same diameter as the diameter of the front dome 121.

The frustoconical cone angle in one embodiment being approximately 90 degrees less the angle of the thrusters. For example if the thruster angle is 45 degrees the cone angle is approximately 45 degrees, if the thruster angle is 50 degrees the cone angle is approximately 40 degrees. Other cone angles are also possible, for example the cone angle may relate to the angle of the lens.

This orientation of the thrust angles allows a camera with a fisheye lens to be used without the lens view being obstructed by the thrusters 101-108. Further referring to FIG. 6 the thrusters 101-104 are located such that they are behind the plane of the lens 125. In a similar manner referring to FIG. 6 the thrusters 105-108 are in front of the lens at the rear 122 of the vehicle.

A control system 135 uses orientation notation and magnitude to refer to the thrust (of individual thrusters or the effect of combined output) which are referred to as thrust vectors below.

In an embodiment where the thrusters 101-108 used on the vehicle 100 have a slight bias in maximum thrust output in the forward direction 120, the thrusters 101-108 can be placed so that when the vehicle is moving forward the thrusters are all driving forward to achieve maximum total thrust. This results in lower maximum total thrust when moving laterally or vertically than forward.

The vehicle 100 is preferably balanced such that the centre of mass and the centre of buoyancy are the same. This allows the vehicle 100 to expend the least amount of energy to hold an arbitrary position in the water. This is quite distinct from the vast majority of underwater vehicles which typically have the centre of buoyancy well above the centre of mass.

The vehicle 100 in an example embodiment contains an onboard 3-axis gyroscope 131 and 3-axis accelerometer 132. The sensor data from these two sensors (which may be combined into one device) are optionally fused using Kalman filters to produce accurate and responsive roll, pitch, and yaw angles (Euler angles), orientation quaternions, or any other orientation notation output and representations of the rates of rotation (e.g. full quaternions for orientation which include rotation rate).

The vehicle 100 may contain an onboard 3-axis electronic compass 133 which may optionally be fused with the gyroscope 131 output using a Kalman filter to increase the responsiveness of the compass. If the compass 133 is enabled, then it can be used instead of the yaw angle from the gyroscope to maintain a heading which is free from the drift present in gyroscope yaw data.

An electronic topside unit 201 sends commands to the vehicle 100 that indicate the target Euler angles, orientation quaternions, or other orientation notation. These is referred to below as the Commanded Orientation.

A control system 135 is responsible for maintaining the attitude of the vehicle 100 in the water both while stationary and moving.

The control system 135 uses control loop feedback mechanisms to maintain the Commanded Orientation. The control loop may make use of both the orientation and rate of change. The output of such feedback mechanisms is a vector which corresponds to the total thrust required to correct and maintain the Commanded Orientation. We call this thrust vector the stabilisation thrust vector.

The topside unit 201 can also send commands to the vehicle 100 that indicate the target translational (x, y, z) thrust. If the vehicle is equipped with a means or determining the speed at which it is moving along any of the translational axes or its position along the axis with great accuracy, then the topside unit 201 may send commands to indicate the speed at which to move and/or the distance to move along that axis.

A depth sensor 134 on the vehicle 100 allows the vertical (z) position (depth) and rate of change to be determined to great accuracy.

A Doppler velocity log may be used to determine speed and distance travelled along the longitudinal and lateral (x and y) axes. Other speed sensors may alternatively be used to measure speed along the longitudinal and lateral axes.

For the translational axis where relative position data or rate of movement data is available (or can be reasonably calculated), the control system 135 may employ control loop feedback mechanisms to maintain position, speed, depth or rate of change.

The translational thrusts are placed in a thrust vector and added to which the stabilisation thrust vector is added. The resulting thrust vector is the target thrust vector.

The control system 135 is configured with the position of each thruster 101-108, measured from the centre of mass, and the angles each thruster is offset from the longitudinal axis towards the lateral and vertical axes. This information is used to calculate the length of the lever arms and then using simple geometry to calculate the thrust vector that each individual thruster applies to the vehicle.

While the individual thruster speeds can be calculated from the target thrust vector using a linear algebra pseudo-inverse, the solution, may only be locally optimised and gimbal lock may result. In addition, there may be a high cost in re-calculating an optimal pseudoinverse when one or more thrusters fail.

The system instead converts the target thrust vector to a set of individual thruster 101-108 speeds through an iterative method.

In order to reduce having to iterate through all possible forward and backward speeds for each thruster 101-108, a process which could take an extremely long time to complete, the problem is simplified by looking at only certain logical groupings of thrusters 101-108.

Each grouping indicates whether each of the 8 thrusters 101-108 are to be run (1) forward, (−1) backward or not used (0), the thruster use status. Most of the groupings are chosen so that they have particular goals, for instance running all thrusters forward will cause the vehicle to move forward without any lateral, vertical or torque components. Other groupings using all 8 thrusters 101-108 allow for independent roll, pitch, yaw, lateral and vertical movements. In addition, there are groupings of 4 thrusters that can achieve the same independent control. And to this we add a small set of 4 thruster groupings which are not optimal—for example, they may largely cause the vehicle to roll, but will also cause some other (undesirable) movement. We also add all adjacent two thruster groups and all individual thrusters.

In the Table 1 below thrusters are 101-108: bottom forward port, bottom forward starboard, top forward port, top forward starboard, bottom aft port, bottom aft starboard, top aft port, top aft starboard.

| Thruster Number | | | | | | | | |
| --- | --- | --- | --- | --- | --- | --- | --- | --- |
| 101 | 102 | 103 | 104 | 105 | 106 | 107 | 108 | Description of resulting thrust vector * |
| 1 | 1 | 1 | 1 | 1 | 1 | 1 | 1 | all forward |
| −1 | −1 | −1 | −1 | −1 | −1 | −1 | −1 | all back |
| −1 | −1 | 1 | 1 | 1 | 1 | −1 | −1 | all up |
| 1 | 1 | −1 | −1 | −1 | −1 | 1 | 1 | all down |
| −1 | 1 | −1 | 1 | 1 | −1 | 1 | −1 | all port |
| 1 | −1 | 1 | −1 | −1 | 1 | −1 | 1 | all starboard |
| 1 | −1 | −1 | 1 | −1 | 1 | 1 | −1 | all roll ccw |
| −1 | 1 | 1 | −1 | 1 | −1 | −1 | 1 | all roll cw |
| 1 | 1 | −1 | −1 | 1 | 1 | −1 | −1 | all pitch down |
| −1 | −1 | 1 | 1 | −1 | −1 | 1 | 1 | all pitch up |
| −1 | 1 | −1 | 1 | −1 | 1 | −1 | 1 | all yaw port |
| 1 | −1 | 1 | −1 | 1 | −1 | 1 | −1 | all yaw starboard |
| 1 | 1 | 1 | 1 | 0 | 0 | 0 | 0 | front forward |
| −1 | −1 | −1 | −1 | 0 | 0 | 0 | 0 | front back |
| 0 | 0 | 0 | 0 | 1 | 1 | 1 | 1 | back forward |
| 0 | 0 | 0 | 0 | −1 | −1 | −1 | −1 | back back |
| 0 | 0 | 1 | 1 | 0 | 0 | −1 | −1 | top up |
| 0 | 0 | −1 | −1 | 0 | 0 | 1 | 1 | top down |
| −1 | −1 | 0 | 0 | 1 | 1 | 0 | 0 | bottom up |
| 1 | 1 | 0 | 0 | −1 | −1 | 0 | 0 | bottom down |
| −1 | 0 | −1 | 0 | 1 | 0 | 1 | 0 | port port |
| 1 | 0 | 1 | 0 | −1 | 0 | −1 | 0 | port starboard |
| 0 | 1 | 0 | 1 | 0 | −1 | 0 | −1 | starboard port |
| 0 | −1 | 0 | −1 | 0 | 1 | 0 | 1 | starboard starboard |
| 1 | 0 | 0 | 1 | −1 | 0 | 0 | −1 | odd roll ccw |
| −1 | 0 | 0 | −1 | 1 | 0 | 0 | 1 | odd roll cw |
| 0 | −1 | −1 | 0 | 0 | 1 | 1 | 0 | even roll ccw |
| 0 | 1 | 1 | 0 | 0 | −1 | −1 | 0 | even roll cw |
| 1 | 1 | 0 | 0 | 0 | 0 | −1 | −1 | easy pitch down |
| −1 | −1 | 0 | 0 | 0 | 0 | 1 | 1 | hard pitch up |
| 0 | 0 | −1 | −1 | 1 | 1 | 0 | 0 | hard pitch down |
| 0 | 0 | 1 | 1 | −1 | −1 | 0 | 0 | easy pitch up |
| −1 | 0 | −1 | 0 | 0 | 1 | 0 | 1 | easy yaw port |
| 1 | 0 | 1 | 0 | 0 | −1 | 0 | −1 | hard yaw starboard |
| 0 | 1 | 0 | 1 | −1 | 0 | −1 | 0 | hard yaw port |
| 0 | −1 | 0 | −1 | 1 | 0 | 1 | 0 | easy yaw starboard |
| 1 | 1 | 0 | 0 | 0 | 0 | 1 | 1 | alternate group forward (less ideal) |
| −1 | −1 | 0 | 0 | 0 | 0 | −1 | −1 | alternate group back (less ideal) |
| 0 | 0 | 1 | 1 | 1 | 1 | 0 | 0 | alternate group forward (less ideal) |
| 0 | 0 | −1 | −1 | −1 | −1 | 0 | 0 | alternate group back (less ideal) |
| −1 | −1 | 0 | 0 | 0 | 0 | −1 | −1 | alternate group up (less ideal) |
| 1 | 1 | 0 | 0 | 0 | 0 | 1 | 1 | alternate group down (less ideal) |
| 0 | 0 | 1 | 1 | 1 | 1 | 0 | 0 | alternate group up (less ideal) |
| 0 | 0 | −1 | −1 | −1 | −1 | 0 | 0 | alternate group down (less ideal) |
| −1 | 0 | −1 | 0 | 0 | −1 | 0 | −1 | alternate group port (less ideal) |
| 1 | 0 | 1 | 0 | 0 | 1 | 0 | 1 | alternate group starboard (less ideal) |
| 0 | 1 | 0 | 1 | 1 | 0 | 1 | 0 | alternate group port (less ideal) |
| 0 | −1 | 0 | −1 | −1 | 0 | −1 | 0 | alternate group starboard (less ideal) |
| 1 | 0 | 0 | 1 | 0 | 1 | 1 | 0 | alternate group roll ccw (less ideal) |
| −1 | 0 | 0 | −1 | 0 | −1 | −1 | 0 | alternate group roll cw (less ideal) |
| 0 | −1 | −1 | 0 | −1 | 0 | 0 | −1 | alternate group roll ccw (less ideal) |
| 0 | 1 | 1 | 0 | 1 | 0 | 0 | 1 | alternate group roll cw (less ideal) |
| 1 | 1 | 0 | 0 | 1 | 1 | 0 | 0 | alternate group pitch down (less ideal) |
| −1 | −1 | 0 | 0 | −1 | −1 | 0 | 0 | alternate group pitch up (less ideal) |
| 0 | 0 | −1 | −1 | 0 | 0 | −1 | −1 | alternate group pitch down (less ideal) |
| 0 | 0 | 1 | 1 | 0 | 0 | 1 | 1 | alternate group pitch up (less ideal) |
| −1 | 0 | −1 | 0 | −1 | 0 | −1 | 0 | alternate group yaw port (less ideal) |
| 1 | 0 | 1 | 0 | 1 | 0 | 1 | 0 | alternate group yaw starboard (less ideal) |
| 0 | 1 | 0 | 1 | 0 | 1 | 0 | 1 | alternate group yaw port (less ideal) |
| 0 | −1 | 0 | −1 | 0 | −1 | 0 | −1 | alternate group yaw starboard (less ideal) |
| 1 | 1 | 0 | 0 | 0 | 0 | 0 | 0 | two thruster matched pair |
| −1 | −1 | 0 | 0 | 0 | 0 | 0 | 0 | two thruster matched pair |
| 1 | 0 | 1 | 0 | 0 | 0 | 0 | 0 | two thruster matched pair |
| −1 | 0 | −1 | 0 | 0 | 0 | 0 | 0 | two thruster matched pair |
| 1 | 0 | 0 | 0 | 1 | 0 | 0 | 0 | two thruster matched pair |
| −1 | 0 | 0 | 0 | −1 | 0 | 0 | 0 | two thruster matched pair |
| 1 | 0 | 0 | 0 | 0 | 0 | 0 | 1 | two thruster matched pair |
| −1 | 0 | 0 | 0 | 0 | 0 | 0 | −1 | two thruster matched pair |
| 0 | 1 | 0 | 1 | 0 | 0 | 0 | 0 | two thruster matched pair |
| 0 | −1 | 0 | −1 | 0 | 0 | 0 | 0 | two thruster matched pair |
| 0 | 1 | 0 | 0 | 0 | 1 | 0 | 0 | two thruster matched pair |
| 0 | −1 | 0 | 0 | 0 | −1 | 0 | 0 | two thruster matched pair |
| 0 | 1 | 0 | 0 | 0 | 0 | 1 | 0 | two thruster matched pair |
| 0 | −1 | 0 | 0 | 0 | 0 | −1 | 0 | two thruster matched pair |
| 0 | 0 | 1 | 1 | 0 | 0 | 0 | 0 | two thruster matched pair |

-continued

| \multicolumn{8}{c|}{Thruster Number} | |
|---|---|---|---|---|---|---|---|---|
| 101 | 102 | 103 | 104 | 105 | 106 | 107 | 108 | Description of resulting thrust vector * |
| 0 | 0 | −1 | −1 | 0 | 0 | 0 | 0 | two thruster matched pair |
| 0 | 0 | 1 | 0 | 0 | 0 | 1 | 0 | two thruster matched pair |
| 0 | 0 | −1 | 0 | 0 | 0 | −1 | 0 | two thruster matched pair |
| 0 | 0 | 1 | 0 | 0 | 1 | 0 | 0 | two thruster matched pair |
| 0 | 0 | −1 | 0 | 0 | −1 | 0 | 0 | two thruster matched pair |
| 0 | 0 | 0 | 1 | 0 | 0 | 0 | 1 | two thruster matched pair |
| 0 | 0 | 0 | −1 | 0 | 0 | 0 | −1 | two thruster matched pair |
| 0 | 0 | 0 | 1 | 1 | 0 | 0 | 0 | two thruster matched pair |
| 0 | 0 | 0 | −1 | −1 | 0 | 0 | 0 | two thruster matched pair |
| 0 | 0 | 0 | 0 | 1 | 1 | 0 | 0 | two thruster matched pair |
| 0 | 0 | 0 | 0 | −1 | −1 | 0 | 0 | two thruster matched pair |
| 0 | 0 | 0 | 0 | 1 | 0 | 1 | 0 | two thruster matched pair |
| 0 | 0 | 0 | 0 | −1 | 0 | −1 | 0 | two thruster matched pair |
| 0 | 0 | 0 | 0 | 0 | 1 | 0 | 1 | two thruster matched pair |
| 0 | 0 | 0 | 0 | 0 | −1 | 0 | −1 | two thruster matched pair |
| 0 | 0 | 0 | 0 | 0 | 0 | 1 | 1 | two thruster matched pair |
| 0 | 0 | 0 | 0 | 0 | 0 | −1 | −1 | two thruster matched pair |
| 1 | 0 | 0 | 0 | 0 | 0 | 0 | 0 | single thruster |
| −1 | 0 | 0 | 0 | 0 | 0 | 0 | 0 | single thruster |
| 0 | 1 | 0 | 0 | 0 | 0 | 0 | 0 | single thruster |
| 0 | −1 | 0 | 0 | 0 | 0 | 0 | 0 | single thruster |
| 0 | 0 | 1 | 0 | 0 | 0 | 0 | 0 | single thruster |
| 0 | 0 | −1 | 0 | 0 | 0 | 0 | 0 | single thruster |
| 0 | 0 | 0 | 1 | 0 | 0 | 0 | 0 | single thruster |
| 0 | 0 | 0 | −1 | 0 | 0 | 0 | 0 | single thruster |
| 0 | 0 | 0 | 0 | 1 | 0 | 0 | 0 | single thruster |
| 0 | 0 | 0 | 0 | −1 | 0 | 0 | 0 | single thruster |
| 0 | 0 | 0 | 0 | 0 | 1 | 0 | 0 | single thruster |
| 0 | 0 | 0 | 0 | 0 | −1 | 0 | 0 | single thruster |
| 0 | 0 | 0 | 0 | 0 | 0 | 1 | 0 | single thruster |
| 0 | 0 | 0 | 0 | 0 | 0 | −1 | 0 | single thruster |
| 0 | 0 | 0 | 0 | 0 | 0 | 0 | 1 | single thruster |
| 0 | 0 | 0 | 0 | 0 | 0 | 0 | −1 | single thruster |

* for the vehicle shown in FIGS. 1-6 (only the description changes for vehicle in alternative orientation)

The thrust vector for each of these groups is calculated during initialisation.

To do this the control system 135 initially sets a remaining thrust vector equal to the target thrust vector, and each thruster speed is initially set to zero.

The control system 135 then iterates through the thrust vectors associated with each of the groups to find the one where the unit vector has the best least-squares approximation to the unit target thrust vector (referred to as best group). A small bias towards using more thrusters is added as there can be 4 and 8 thruster solutions which are equally optimal. The thrust vector for the best group is scaled by the dot product (or equivalent) of the remaining thrust vector and the thrust vector for the best group. This vector is the output vector.

The magnitude of the output vector multiplied by the thruster use status (−1, 0, or 1) for each of the thrusters which is added to that thruster's thruster speed.

The remaining thrust vector is set to the difference between the remaining thrust vector and the output vector. The process continues onto the next iteration if the magnitude of the remaining thrust vector is significant and the limit of iterations has not been reached.

The control system 135 can compensate for thruster 101-108 failures. A failed thruster can be detected through several means: feedback of thruster RPMs, which can be accomplished through the speed controllers of brushless DC motors, can be used to detect a stalled thruster or a thruster with a broken prop; thrusters 101-108 can be disabled manually by the operator; and/or the stabilisation thrust vector can be analysed to see if it shows a bias consistent with a single (or multiple) thruster failure. In all cases the thruster(s) are flagged by the control system 135 as failed.

When iterating to determine thruster speeds with one or more failed thrusters 101-108, groups which use any failed thruster are simply not evaluated.

These thruster groupings balance time to compute with solution accuracy, different thruster groupings may be used with similar effect.

Anti-Silt

The thrusters 101-108 of a vehicle 100 using vectored thrusters may have elements of the thrust in undesirable directions (towards silt). For instance, when moving forward with the vehicle 100, if the lower aft thrusters 101, 102, 105, 106 are engaged they will direct water downwards. On the sea floor there is often a layer of fine silt which is easily stirred up. Inside a wreck not only can silt be present on the surfaces below the vehicle 100, but silt can be found on surfaces in front of or behind the vehicle 100. It's useful to minimise the disturbance of water away from the vehicle 100.

Not all thrusters 101-108 need to be used to achieve the desired movement—thrusters 101-108 can be selected such that they minimise undesirable thrust vectors (for instance when moving forward, if only the forward 4 thrusters 101-104 are used, the downward component from the upper thrusters 103, 104 are counteracted by an upward component from the lower thrusters 101, 102. And when moving in reverse the aft 4 thrusters 105-108 can used to similar effect). In some instances thrusters further away from the silt can be used instead of the thrusters closest to the silt (such as using only the top 4 thrusters 103, 104, 107, 108 to drive the vehicle up/down when near the bottom).

When evaluating the target thrust vector, any positive longitudinal component (forward) only the forward 4 thrusters 101-104 are used. For a negative longitudinal component (reverse), only the aft 4 thrusters 105-108 are used. For any vertical component in either direction only the upper 4 thrusters 103, 104, 107, 108 are used. For any lateral component to port, only the starboard 4 thrusters 102, 104, 106, 108 are used, and for any lateral component to starboard, only the port 4 thrusters 101, 103, 105, 107 are used. For yaw to starboard only the forward port thrusters 101, 103 and alt starboard thrusters 106, 108 are used. For yaw to port only the forward starboard thrusters 102, 104 and aft port thrusters 105, 107 are used. For pitch down only, the top forward thrusters 103, 104 and aft bottom thrusters 105, 106 are used. For pitch up only, the bottom forward thrusters 101, 102 and aft top thrusters 107, 108 are used. For roll to starboard (clockwise) only the bottom forward starboard 102, top forward port 103, bottom aft starboard 106, and top aft port 107 thrusters are used. And for roll to port (anti-clockwise) only the bottom forward port 101, top forward starboard 104, bottom aft port 105, and top aft starboard 108 thrusters are used.

In addition, the maximum thrust from any single thruster can be limited, both for movement and stability control to minimise disturbance of the water.

These mechanisms when applied individually or together, provide a mechanism to minimise silt disturbance.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. An underwater vehicle comprising:
a vehicle body, having a centre, a front, back, sides, top and bottom, wherein the underwater vehicle has a centre of mass and a centre of buoyancy and the underwater vehicle is balanced such that the centre of mass and the centre of buoyancy are the same;
eight thrusters aligned such that all the thrusters are offset from a longitudinal centreline and a transversal centreline relative to the vehicle body, each of the thrusters being located at a corner of the vehicle, the offset of the thrusters being such that thrust from the thrusters is outside of an area defined by a front frustoconical cone projecting from the front of the vehicle body and a rear frustoconical cone projecting from the rear of the vehicle body, the front frustoconical cone being centred on the centre of the front of the vehicle, the front frustoconical cone having a small end and a large end, the small end of the front frustoconical cone located at the front of the vehicle, the rear frustoconical cone being centred on the centre of the rear of the vehicle, the rear frustoconical cone having a small end and a large end, the small end of the rear frustoconical cone located at the rear of the vehicle; and
a controller operable to activate the thruster to move the vehicle in a desired direction;
wherein:
the angles the thrusters are offset from vertical and horizontal is selected from the group consisting of: between 40° and 50° degrees, between 44° and 46° degrees, and 45° degrees,
a frustoconical cone angle of the frustoconical cone is correspondingly selected from the group consisting of: between 50° and 40° degrees, between 46° and 44° degrees, and 45° degrees,
the frustoconical cone angle and the angles the thrusters are offset from vertical adding to substantially 90°,
the controller is operable to move the vehicle in a longitudinal direction forward or backwards, in a vertical direction, upwards or downwards, in a lateral direction to port or starboard,
the controller is operable to pitch, yaw or roll the vehicle,
the controller is operable to move the vehicle with less than eight thrusters, and
the controller is operable to detect objects that may be disturbed by thruster operation and operate the thrusters to minimise disturbance.

2. The underwater vehicle of claim 1 wherein the vehicle further has a dome located at the front of the vehicle, the small end of the front frustoconical cone being substantially the size of as the dome.

3. The underwater vehicle of claim 2 wherein a camera lens is located in the dome and substantially directed horizontally to the front of the vehicle, the thrusters being located such that the thrusters are located on the vehicle such that the thrusters are within a vertical plane at the front of the lens.

4. The underwater vehicle of claim 1 wherein the controller is operable to detect inoperable thrusters.

5. The underwater vehicle of claim 1 wherein the object that may be disturbed is silt.

6. The underwater vehicle of claim 1 wherein the vehicle is a remotely controlled vehicle, a remote operated vehicle, an autonomous vehicle, or an autonomous underwater vehicle.

* * * * *